(12) United States Patent
Horton (10) Patent No.: US 7,670,097 B2
(45) Date of Patent: Mar. 2, 2010

(54) VEHICLE CARGO MANAGEMENT DEVICE

(76) Inventor: James A. Horton, 2154 Coventry Rd., Lancaster, PA (US) 17601

( * ) Notice: Subject to any disclaimer, the term of this patent is extended or adjusted under 35 U.S.C. 154(b) by 0 days.

(21) Appl. No.: 11/769,876

(22) Filed: Jun. 28, 2007

(65) Prior Publication Data

US 2009/0001750 A1    Jan. 1, 2009

(51) Int. Cl.
*B60P 9/00*    (2006.01)
(52) U.S. Cl. ...................................................... 414/462
(58) Field of Classification Search ................. 414/462, 414/466, 537–539
See application file for complete search history.

(56) References Cited

U.S. PATENT DOCUMENTS

| | | | |
|---|---|---|---|
| 1,699,882 A | | 1/1929 | Ferguson |
| 2,414,447 A | | 1/1947 | Cargile |
| 2,953,287 A * | | 9/1960 | Werner ........................ 224/496 |
| 3,168,959 A | | 2/1965 | Chandler et al. |
| 3,339,968 A | | 9/1967 | Hall |
| 3,365,084 A * | | 1/1968 | Fernicola .................... 414/462 |
| 3,627,158 A * | | 12/1971 | Kobasic ...................... 414/462 |
| 3,642,156 A | | 2/1972 | Stenson |
| 3,870,178 A * | | 3/1975 | Ellen .......................... 414/462 |
| 4,127,201 A | | 11/1978 | Baumann |
| 4,604,022 A * | | 8/1986 | Bourgraf ..................... 414/340 |
| 4,624,619 A | | 11/1986 | Uher |
| 4,685,860 A * | | 8/1987 | McFarland .................. 414/720 |
| 4,753,567 A * | | 6/1988 | Achee, Sr. .................. 414/462 |
| 4,799,849 A * | | 1/1989 | Miller ......................... 414/462 |
| 4,878,800 A | | 11/1989 | Dell |
| 4,887,526 A * | | 12/1989 | Blatt ........................... 108/44 |
| 5,259,081 A | | 11/1993 | Henderson |
| 5,649,732 A * | | 7/1997 | Jordan et al. ................ 296/26.1 |
| 5,707,203 A | | 1/1998 | Richter |
| 5,935,011 A | | 8/1999 | Morgan et al. |
| 6,079,941 A | | 6/2000 | Lee |
| 6,149,372 A | | 11/2000 | Lee et al. |
| 6,241,452 B1 | | 6/2001 | Eekhoff |
| 6,709,038 B2 * | | 3/2004 | Bienert et al. .............. 296/26.1 |

FOREIGN PATENT DOCUMENTS

| CH | 663946 A5 | 1/1988 |
|---|---|---|
| GB | 2414463 A | 11/2005 |

\* cited by examiner

*Primary Examiner*—Saúl J Rodriguez
*Assistant Examiner*—Joshua I Rudawitz
(74) *Attorney, Agent, or Firm*—McNees Wallace & Nurick, LLC (57) ABSTRACT

A cargo management device and vehicle including a cargo management device having a base portion having a surface. The device also includes a support portion pivotably mounted to the base portion and being configured to receive cargo. A locking member is pivotably mounted to the support member and in sliding contact with the surface of the base portion. The support member is capable of detachable engagement with a portion of the surface. A bridge portion is associated with the support portion and is capable of being secured at a first position with respect to the support portion. The device is capable of loading and unloading cargo from a cargo compartment by an incline formed by the support portion. A method for unloading cargo is also disclosed.

20 Claims, 8 Drawing Sheets

Figure 1:
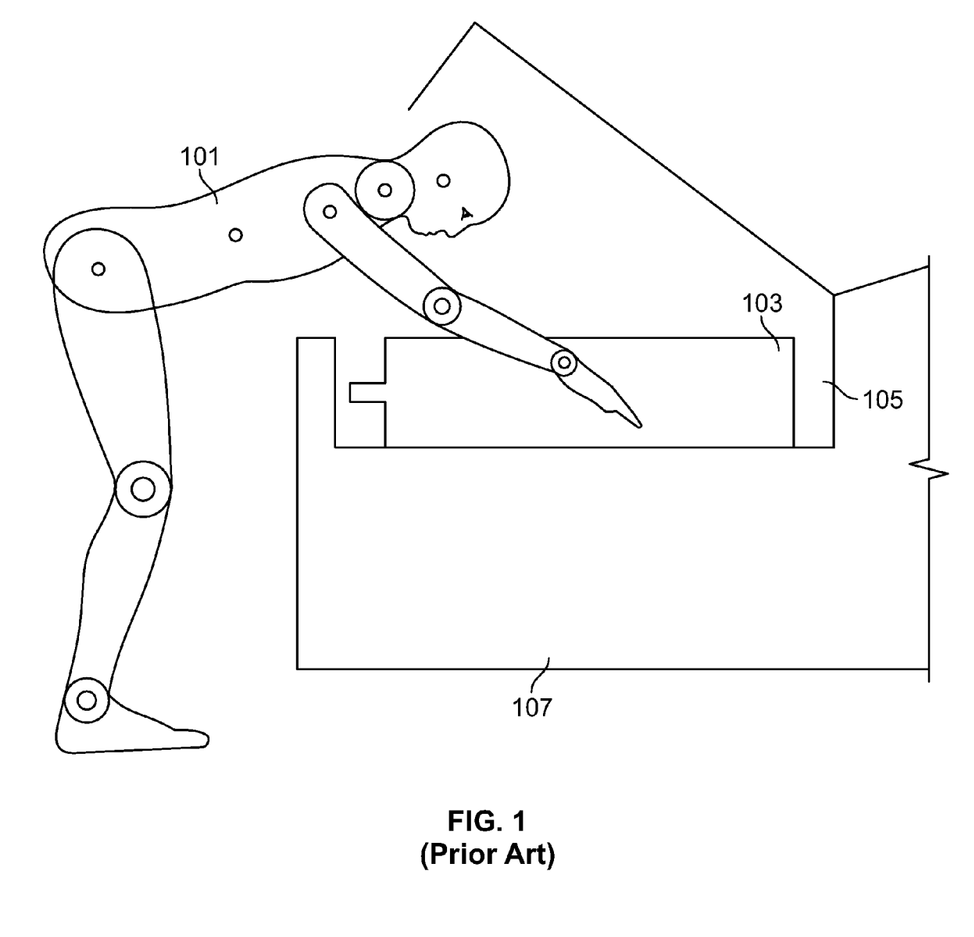
FIG. 1 illustrates an elevational cross-section of personnel lifting cargo into or out of a vehicle using a known method.

FIG. 10 ered to extract cargo 103 from cargo compartments 105 of vehicles 107. In addition, additional time is required to manipulate cargo, particularly if cargo has shifted in the trunk of an automobile. Further, cargo that is repeatedly loaded and unloaded may be damaged by the manipulations required to load and unload the cargo.

What is needed is a cargo management device that permits easy loading and unloading of cargo, with reduced or eliminated risk of back strain and allows for use in vehicles, such as automobiles or sport-utility vehicles.

SUMMARY OF THE INVENTION

One aspect of the present invention includes a cargo management device having a base portion having a surface. The device also includes a support portion pivotably mounted to the base portion and being configured to receive cargo. A locking member is pivotably mounted to the support portion and in sliding contact with the surface of the base portion. The locking member is capable of detachable engagement with a portion of the surface. A bridge portion is associated with the support portion and is capable of being secured at a first position with respect to the support portion. The device is capable of loading and unloading cargo from a cargo compartment by an incline formed by the support portion.

Another aspect of the present invention includes a vehicle capable of carrying cargo. The vehicle includes a cargo compartment and a cargo management device disposed at least partially within the cargo compartment. The device includes a base portion having a surface and a support portion pivotably mounted to the base portion and being configured to receive cargo. The device further includes a locking member pivotably mounted to the support portion and is in sliding contact with the surface. The locking member is capable of detachable engagement with a portion of the surface. A bridge portion is associated with the support portion and is capable of being secured at a first position with respect to the support portion. The device is capable of loading and unloading cargo from the cargo compartment by an incline formed by the support portion.

Still another aspect of the present invention includes a method of unloading a vehicle having a cargo compartment having cargo disposed therein. The method includes providing a cargo management device having a base portion having a surface and a support portion pivotably mounted to the base portion and being configured to receive cargo. A locking member is pivotably mounted to the support portion and is in sliding contact with the surface. The locking member is capable of detachable engagement with a portion of the surface. A bridge portion is associated with the support portion and is capable of being secured at a first position with respect to the support portion. The support portion is pivoted in a direction away from the base portion. The bridge portion is pivoted into the second position, substantially parallel to the base portion and the locking member is engaged with the portion of the surface. Cargo is transported from the support portion to the bridge portion.

An advantage of an embodiment of the present invention includes the ability to manage cargo in vehicles having trunks or similar recessed spaces.

Another advantage of an embodiment of the present invention is that the cargo is easily loaded and unloaded from the vehicle's storage compartment.

Still another advantage of an embodiment of the present invention is that the device may be operated quickly and easily with little effort or manipulation of the device.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 2:
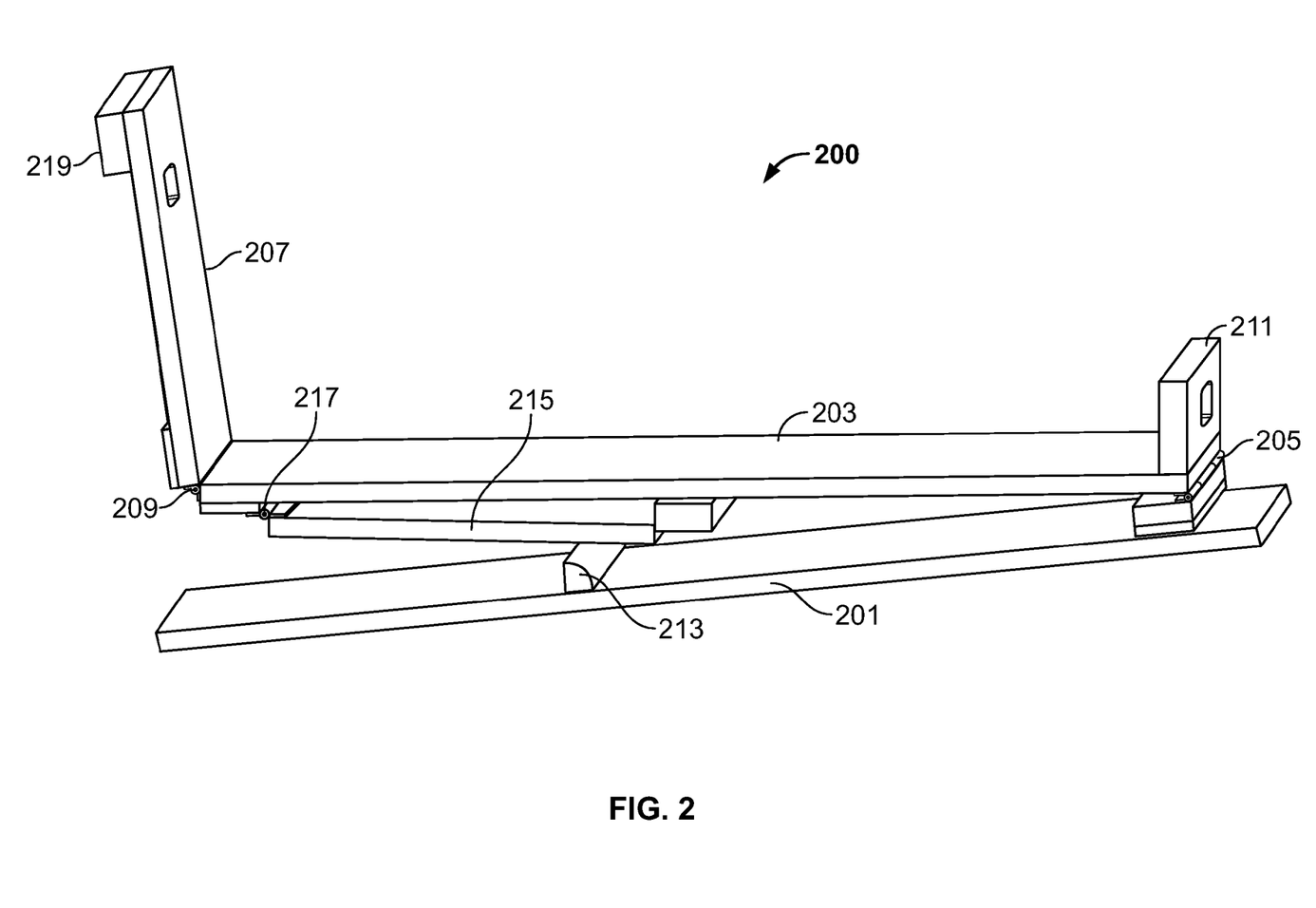
FIG. 2 shows a perspective view of a cargo manipulation device in a retracted position according to an embodiment of the present invention.
Figure 3:
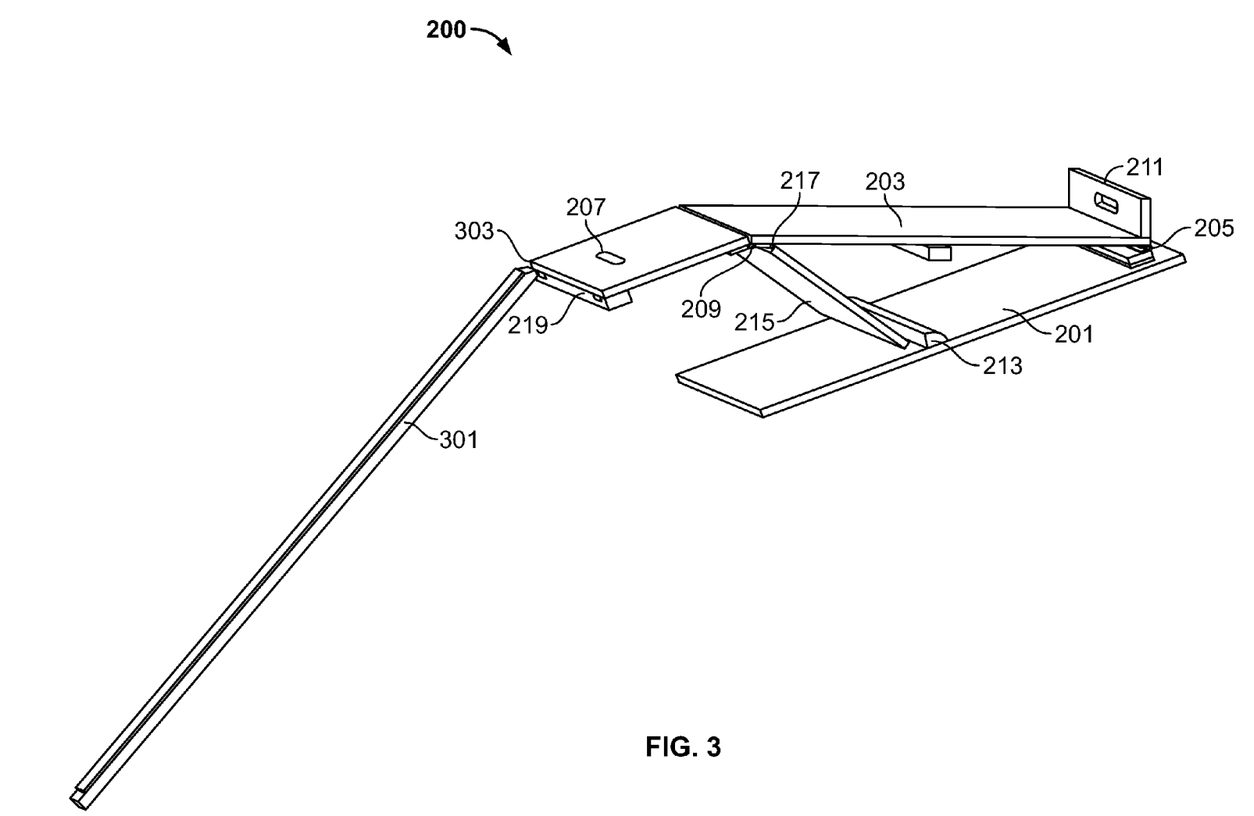
FIG. 3 shows a perspective view of a cargo manipulation device in an extended position according to an embodiment of the present invention.

FIG. 2 shows a cargo manipulation device 200 according to an embodiment of the present invention in a retracted position. The device 200 is positioned in a location requiring manipulation of cargo 103 (see FIGS. 7, 8 and 9) or other device, such as the trunk of an automobile or sport utility vehicle. The device 200 includes a base portion 201 and support portion 203. The support portion 203 is pivotably mounted to the base portion 201 by a hinge 205. The present invention is not limited to a hinge 205 and may include any connection between the base portion 201 and support portion 203 that provides relative pivoting motion. A bridge portion 207 is associated with the support portion 203 and attachable in order to provide unloading of the cargo. In the embodiment shown in FIG. 2, the bridge portion 207 is pivotably mounted to support portion 203 by a hinge 209. The present invention is not limited to a hinge 209 and may include any connection between the support portion 203 and bridge portion 207 that provides relative pivoting motion. The bridge portion 207 pivots from an extended position (as shown in FIG. 3) approximately horizontal and substantially parallel to the base portion 201 to a retracted position (as shown in FIG. 2) approximately vertical and substantially perpendicular to the base portion 201. In other embodiments, bridge portion 207 may be slidably or fixedly engaged/disengaged with support portion 203, if desired, or if bridge portion 207 is too large to maintained in a retracted position (see FIG. 2). A ramp connector 219 is attached to one end of bridge portion 207. Ramp connector 219 is an optional structure that may include any structure onto which ramp members 301 may be attached. The ramp connector 219 may include features, devices or other structures suitable for detachable engagement of ramp members 301 or other devices useful for unloading cargo from the device 200. Although only a single ramp member 301 is shown, any number of ramp members 301 may be utilized, as desired. In one embodiment of the invention, ramp connector 219 may include integral ramp members 301, which may be stored and within ramp connector 219 and deployed, such as by telescoping mechanical action, from the ramp connector 219 to the desired location for which the cargo 103 is to be loaded. In another embodiment, the ramp members 301 may be omitted, wherein cargo 103 may be removed directly from bridge portion 207.

As shown in FIGS. 2-3, the base portion 201 further includes a stop 213 to detachably engage a locking member 215, which is pivotably attached to the support portion 203 at hinge 217. The present invention is not limited to a hinge 217 and may include any connection between the support portion 203 and locking member 215 that provides relative pivoting motion. Locking member 215 is preferably capable of sliding contact with base portion 201. Sliding contact is not limited to constant contact, but includes relative motion of at least a portion of the locking member 215 adjacent or in contact with the base portion 201. The stop 213 is mounted on the base portion 201 at a location arranged and disposed to provide the desired angle for the support portion 203 with respect to the base portion 201. The desired angle is dependent upon the application, cargo 103 and/or the depth of the storage or cargo compartment 105 or cargo area. In addition, stop 213 may have any geometry and any structure that provides a detachable engagement of the locking member 215. The stop 213, when engaged (see e.g., FIG. 3) reacts to force applied along locking member 215, as a result of the load applied to the support portion 203 (e.g., from weight of cargo).

FIG. 3 shows cargo manipulation device 200 according to an embodiment of the present invention in an extended position. The device 200 is positioned in a location requiring manipulation of cargo 103, such as the trunk or cargo area of an automobile or sport utility vehicle. The device 200 includes a base portion 201, support portion 203 and locking member 215 substantially as shown and described in FIG. 2. In this embodiment of the invention, locking member 215 is in engagement with stop 213. In addition, ramp member 301 has been connected to ramp connector 219 via ramp member joint 303.

Figure 4:
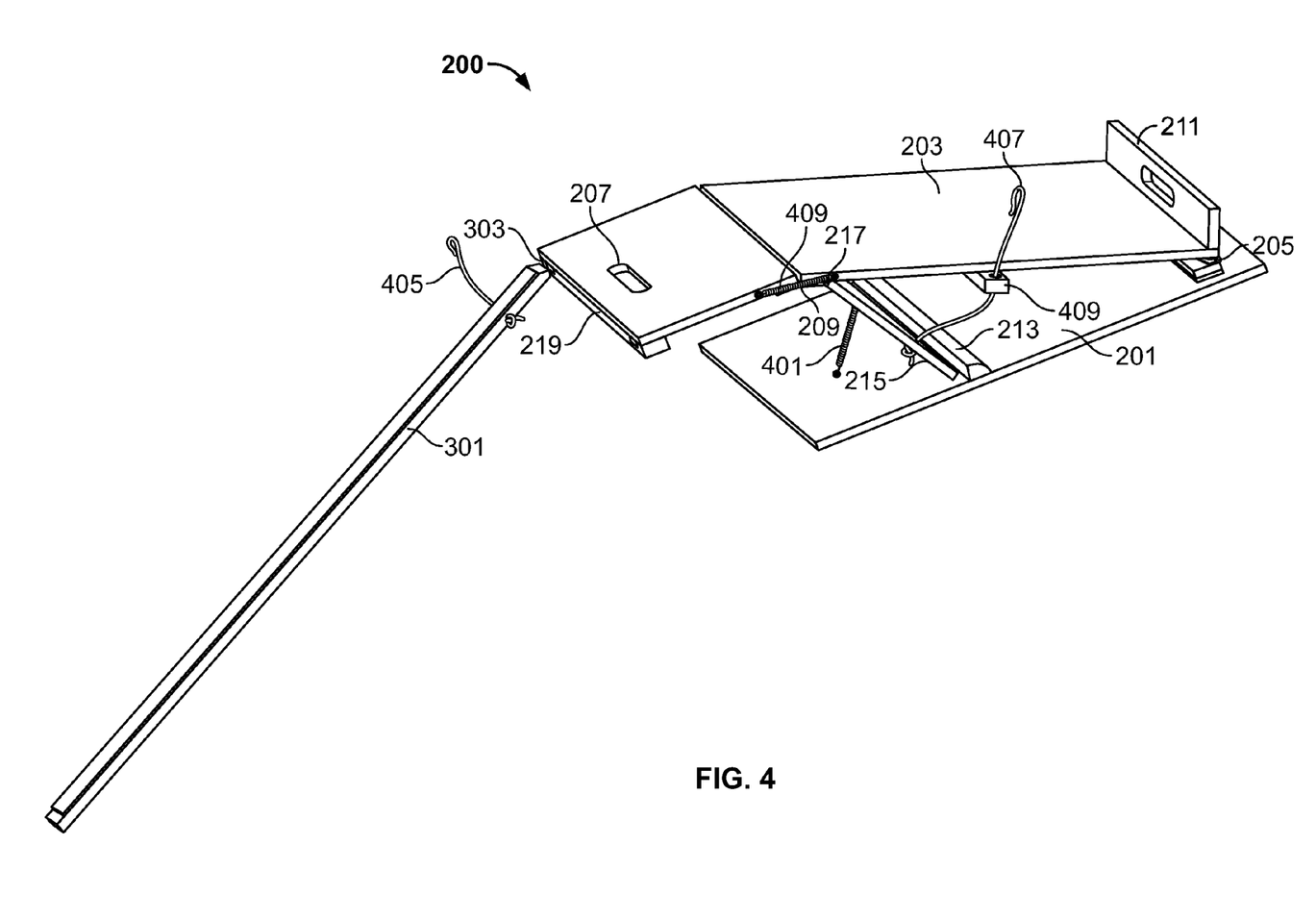
FIG. 4 shows a perspective view of a cargo manipulation device according to an embodiment of the present invention.

FIG. 4 shows an alternate embodiment of the present invention, wherein the device 200 is in a partially retracted position. In this embodiment, one end of a spring 403 may be affixed to the bridge portion 207 and the opposite end of the spring 403 may be affixed to the support portion 203 in a manner to provide engagement and positioning of the bridge portion 207 at the desired angles to the support portion. In particular, the spring 403 may be arranged to hold the bridge portion 207 in the retracted position and, upon operation of the device 200, holds the bridge portion 207 in the extended position. In addition, one or more springs 401 may be attached at one end to the locking portion 215 and at the other end to the base portion 201 to provide positive positioning of the locking portion 215 during extension of the device. Ramp members 301 are optional components that may include a sturdy rectangular, tube, channel or otherwise elongated geometry that connects at the end of the bridge portion 207 opposite the support portion 203 to the ground, or other location onto which the movement of cargo 103 is desired. A ramp removal cord 405 may be included to assist the operator in installing and removing the ramp members 301. A ramp member joint 303 secures the ramp member 301 to the ramp connector 219. Also shown in FIG. 4 is a disengagement cord 407, which passes through disengagement block 409 and attaches to locking member 215. Pulling or otherwise placing disengagement cord 407 in tension provides a force urging the locking member 215 out of engagement with stop 213 when retraction of device 200 is desired. The present invention is not limited to a disengagement cord 407 and may include any device that is capable of disengaging the locking member 215 from stop 213. In addition, disengagement of locking member 215 from stop 213 may be achieved manually by an operator.

Although FIGS. 3 and 4 show a single ramp member 301, a plurality of ramp members 301 may also be used. While not required, latches, loops, handles or other structure may be incorporated into the device 200 for ease of handling. In addition, cargo stop 211 may be affixed to the support portion 203 in order to guide and/or retain cargo 103 in position, particularly during loading and/or transportation of the cargo 103. Likewise, springs or other force providing devices may be arranged and disposed along and connecting the support portion 203, bridge portion 207, locking member 215 and the base portion 201. In addition, base portion 201 may additionally include risers, blocks, feet, or other support structure to accommodate floor level variations between installation locations. In addition, a protective covering, such as carpeting, fabric, insulation, polymeric material or other protective material, may be applied on one or more of the ramp member 301, bridge portion 207, support portion 203, base portion 201 and/or locking member 215 to prevent damage to the surface of the cargo 103 or the vehicle 107 (see e.g., FIG. 7) or compartment 105. Latches, hooks, or other mechanical devices may be incorporated into device 200 to hold the ramp member 301, bridge portion 207, support portion 203, base portion 201 and/or locking member 215 in place when moved or handled.

Figure 5:
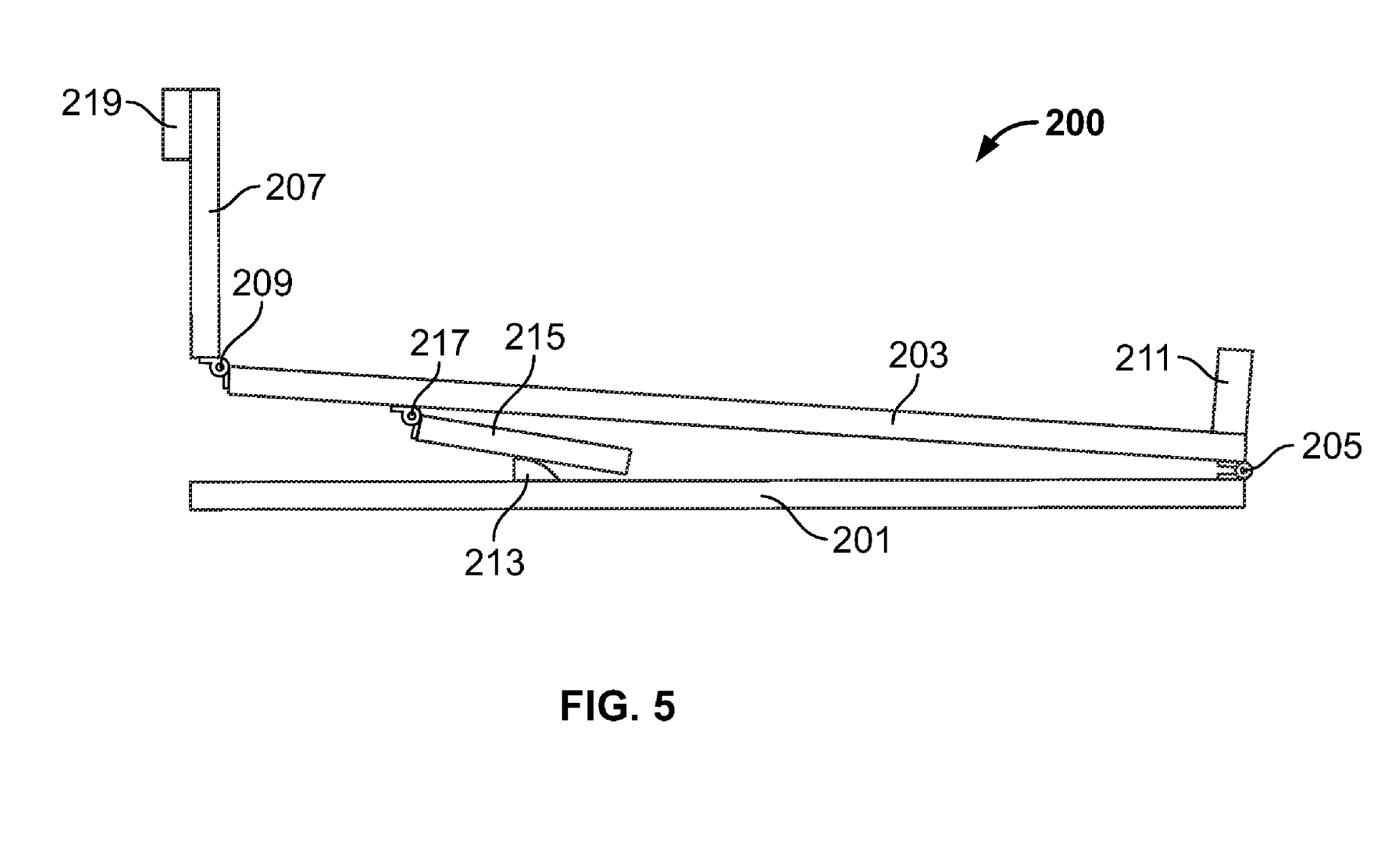
FIG. 5 shows an elevational side view of a cargo manipulation device in a retracted position according to an embodiment of the present invention.
Figure 6:
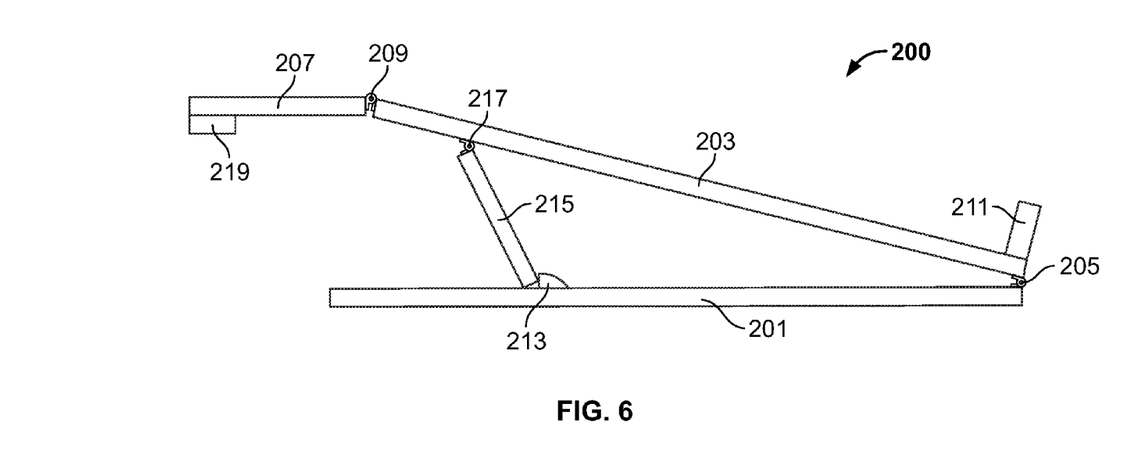
FIG. 6 shows an elevational side view of a cargo manipulation device in an extended position according to an embodiment of the present invention.

FIGS. 5 and 6 show side views of the device 200 in a retracted position (FIG. 5) and an extended position (FIG. 6). The base portion 201 is preferably positioned on the floor of a vehicle cargo compartment 105 (FIG. 7) or other support structure. In one embodiment, the base portion 201 is disposed in the trunk of an automobile or other passenger vehicle. In operation, one end of the locking member 215 pivots away from the support portion 203 moves along an adjacent surface, preferably in sliding contact, with base portion 201, over and/or in contact with stop 213. Extension may be achieved by manual or other force provided to bridge portion 207 urging the bridge portion 207 to pivot about hinge 209. The invention is not limited to operating the device 200 by pivoting the bridge portion 207 and may include manually or remotely pivoting the support portion 203 or the locking member 215. In one embodiment, the pivoting of bridge portion 207 results in the pivoting of support portion 203 and locking member 215. As shown, the locking member 215 and support portion 203 move and pivot about their respective hinges 217,215 until the locking member 215 engages stop 213. In the embodiment shown in FIG. 6, the locking member 215 is retained in engagement against stop 213 by weight of the support portion 203 and any cargo 103 thereon. The locking member 215 remains in the extended position until the locking member 215 is disengaged from the stop 213. Disengagement may be provided by direct, manual movement of the locking member 215 from the stop 213. Alternatively, a rope, wire or mechanical linkage may be affixed to the locking member 215 to apply a force to disengage the locking member 215 from stop 213. In one example, a disengagement cord 407 (FIG. 4) is utilized to disengage the locking member 215 from stop 213. Once the locking member 215 is disengaged, the locking member 215 slides or otherwise moves along base portion 201 until the support potion 203 is pivoted to a position substantially adjacent to the base portion 201. Prior to retraction, the ramp portions 301 may be removed or retracted.

Figure 7:
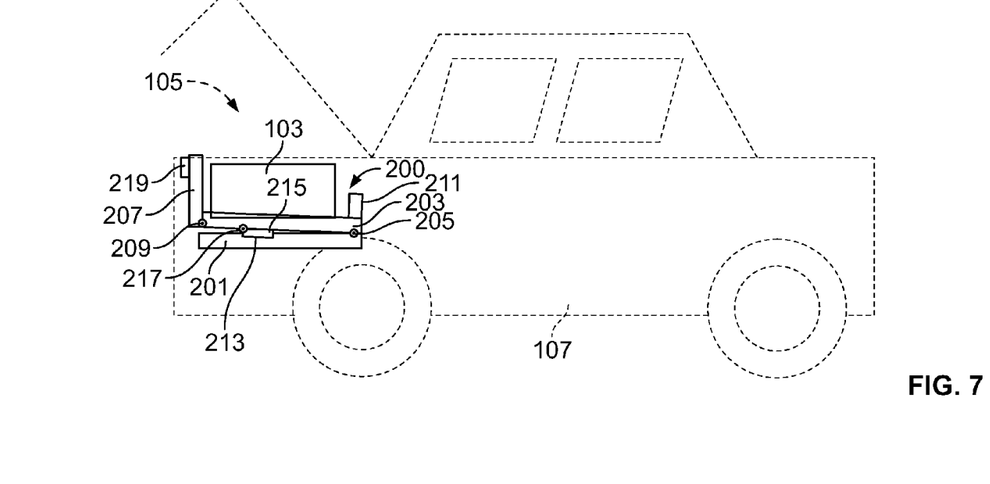
FIG. 7 shows a vehicle and cargo manipulation system in a retracted position according to an embodiment of the present invention.

FIG. 7 shows a cargo manipulation device 200 according to the present invention installed in a vehicle 107 having a cargo compartment 105. As shown, device 200 is in the retracted position with cargo 103 resting upon the support portion 203.

Figure 8:
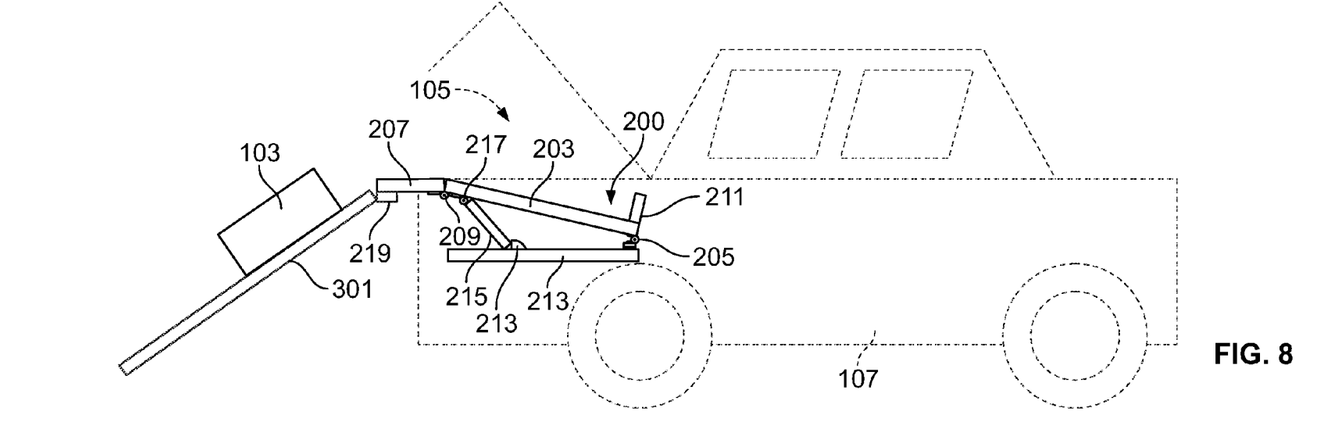
FIG. 8 shows a vehicle and cargo manipulation system in an extended position according to an embodiment of the present invention.

FIG. 8 shows the cargo manipulation device in FIG. 7 in an extended position according to one embodiment of the present invention. In this embodiment of the invention, ramp members 301 have been installed and attached to bridge portion 207 to permit rolling or sliding of the cargo 103 from the cargo compartment 105 to the ground or other desired location.

Figure 9:
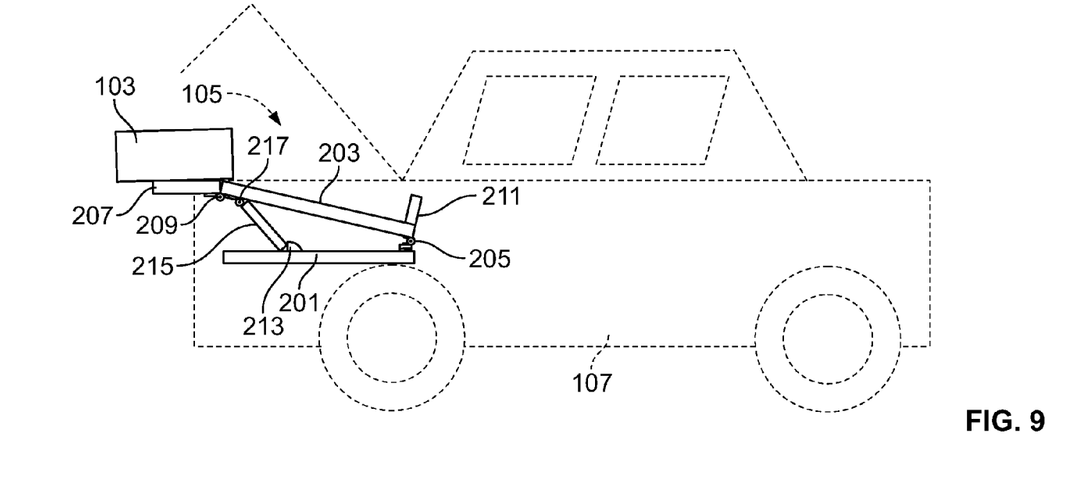
FIG. 9 shows a vehicle and cargo manipulation system in an extended position according to another embodiment of the present invention.

FIG. 9 shows the cargo manipulation device 200 in FIG. 7 in an extended position according to another embodiment of the present invention. In this embodiment, the cargo 103 may be rolled or slid from the cargo compartment 105 to a location on bridge portion 207, wherein the cargo 103 may be removed from vehicle 107.

Figure 10:
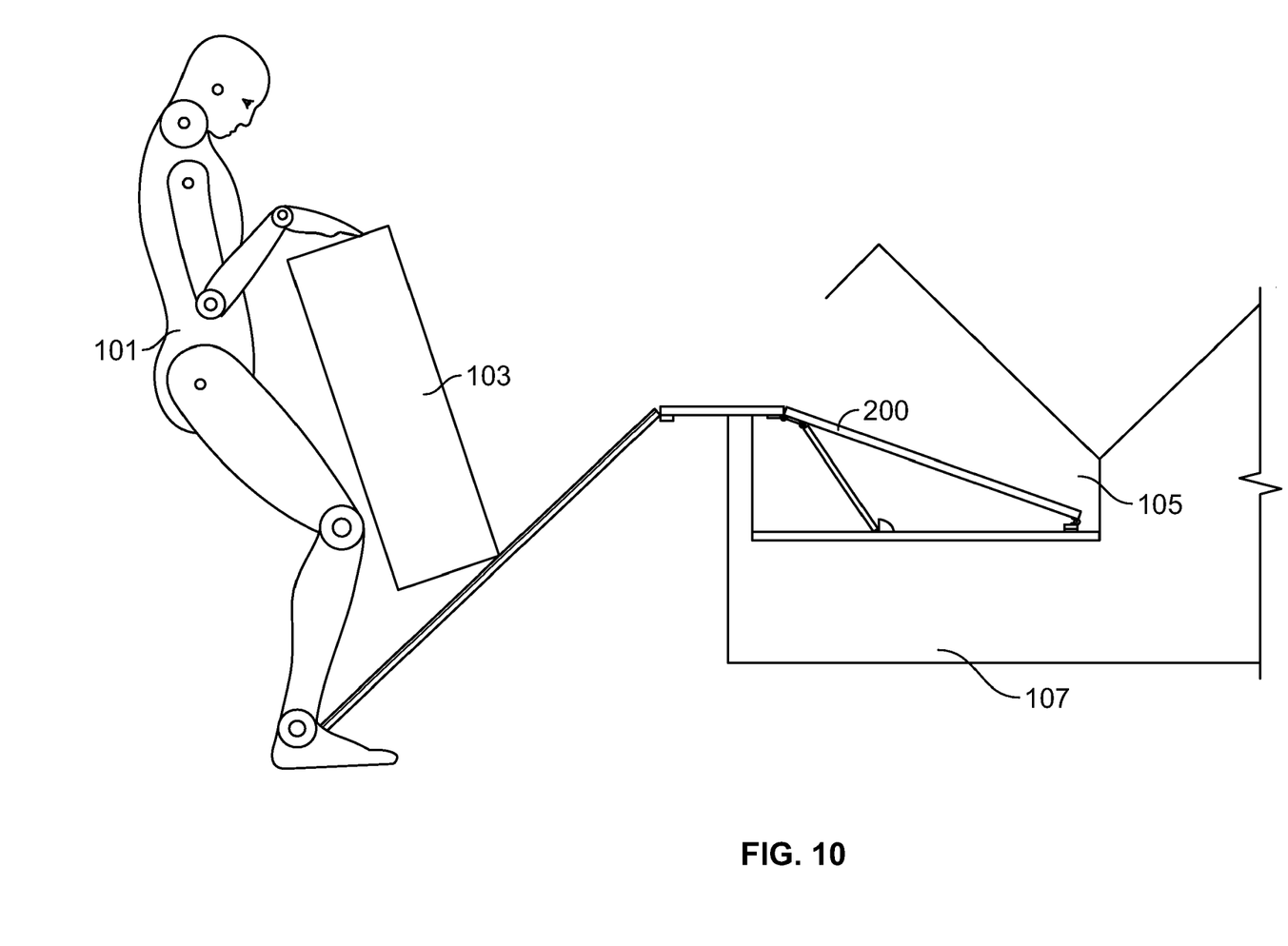
FIG. 10 illustrates an elevational cross-section of personnel lifting cargo into or out of a vehicle using an embodiment of the present invention.

FIG. 10 personnel 101 lifting cargo 103 using a cargo manipulation device 200 according to an embodiment of the invention in a manner that reduces or eliminates back strain during the extraction or loading of cargo 103 into cargo compartment 105 of vehicle 107. As shown, safe lifting techniques may be utilized, wherein cargo 103 may be moved or otherwise transported manually with reduced injury to personnel 101. In addition, reduced time is required to manipulate cargo 103, and cargo 103 is substantially prevented from shifting when loaded onto the cargo manipulation device 200.

While FIGS. 7-9 show installation of the device 200 in a passenger vehicle 107, the device may be installed in any location requiring lifting of cargo 103 or components from a position within a compartment or from a horizontal position to an inclined position. While not so limited, the device 200 may be utilized in cargo compartments 105 of vehicles 107 such as automobiles, sport utility vehicles, water vehicles, aircraft or any other vehicle capable of transporting cargo 103. In addition, the device 200 may be utilized in stationary locations, such as storage areas of homes or businesses, closets, file shelves or any other location requiring lifting or manipulation of heavy components.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A cargo management device comprising:
   a base portion having a surface and a first end;
   a support portion pivotably mounted to the base portion at a first location proximate to the first end of the base portion, the support portion having a second end and being configured to receive cargo, the second end being distal to the first end of the base portion;
   a locking member pivotably mounted to the support portion and in sliding contact with the surface, the locking member being capable of detachable engagement with a portion of the surface;
   a bridge portion only pivotably mounted to the support portion at a second location proximate to the second end of the support portion, the bridge portion being securable in a retracted position and an extended position, the retracted position being perpendicular to the base portion, the extended position being parallel to the base portion; and
   a spring attached to the support portion and to the bridge portion, and arranged to hold the bridge portion in either the extended position or the retracted position;
   wherein the device is capable of loading and unloading cargo from a cargo compartment by an incline formed by the support portion.

2. The device of claim 1, wherein the portion of the surface further comprises a stop.

3. The device of claim 1, further comprising a force-providing device arranged and disposed to urge the bridge portion into one or both of the retracted position and the extended position.

4. The device of claim 1, further comprising a ramp member configured to transport cargo to and from the support portion.

5. The device of claim 4, wherein the ramp member is detachably engaged with the bridge portion.

6. The device of claim 1, further comprising a device arranged and disposed to selectively disengage the locking member from the portion of the surface.

7. The device of claim 6, wherein the device is a wire, string or rope.

8. A vehicle capable of carrying cargo comprising:
   a cargo compartment;
   a cargo management device disposed at least partially within the cargo compartment, the device having:
     a base portion having a surface and a first end;
     a support portion pivotably mounted to the base portion at a first location proximate to the first end of the base portion, the support portion having a second end and being configured to receive cargo, the second end being distal to the first end of the base portion;
     a locking member pivotably mounted to the support portion and in sliding contact with the surface, the locking member being capable of detachable engagement with a portion of the surface;

a bridge portion only pivotably mounted to the support portion at a second location proximate to the second end of the support portion, the bridge portion being securable in a retracted position and an extended position, the retracted position being perpendicular to the base portion, the extended position being parallel to the base portion; and a spring attached to the support portion and to the bridge portion, and arranged to hold the bridge portion in either the extended position or the retracted position;

wherein the device is capable of loading and unloading cargo from the cargo compartment by an incline formed by the support portion.

9. The vehicle of claim 8, wherein the portion of the surface further comprises a stop.

10. The vehicle of claim 8, further comprising a force-providing device arranged and disposed to urge the bridge portion into one or both of the retracted position and the extended position.

11. The vehicle of claim 8, further comprising a ramp member configured to transport cargo to and from the support portion.

12. The vehicle of claim 11, wherein the ramp member is detachably engaged with the bridge portion.

13. The vehicle of claim 8, further comprising a device arranged and disposed to selectively disengage the locking member from the portion of the surface.

14. The vehicle of claim 13, wherein the device is a wire, string or rope.

15. The vehicle of claim 1, wherein the cargo compartment is a trunk of an automobile.

16. The vehicle of claim 1, wherein the cargo compartment is a cargo area of a vehicle.

17. A method of unloading a vehicle having a cargo compartment having cargo disposed therein, the method comprising:

providing a cargo management device comprising:
    a base portion having a surface and a first end;
    a support portion pivotably mounted to the base portion at a first location proximate to the first end of the base portion, the support portion having a second end and being configured to receive cargo, the second end being distal to the first end of the base portion;
    a locking member pivotably mounted to the support portion and in sliding contact with the surface, the locking member being capable of detachable engagement with a portion of the surface;
    a bridge portion only pivotably mounted to the support portion at second location proximate to the second end of the support portion, the bridge portion being securable in a retracted position and an extended position, the retracted position being perpendicular to the base portion, the extended position being parallel to the base portion; and
    a spring attached to the support portion and to the bridge portion, and arranged to hold the bridge portion in either the extended position or the retracted position;
pivoting the support portion in a direction away from the base portion;
pivoting the bridge portion from the retracted position to the extended position;
engaging the locking member with the portion of the surface; and
transporting cargo from the support portion to the bridge portion.

18. The method of claim 17, further comprising attaching at least one ramp portion to the bridge portion.

19. The method of claim 17, wherein the cargo compartment is a trunk of an automobile.

20. The method of claim 17, wherein the cargo compartment is a cargo area of a vehicle.

* * * * *